United States Patent
Tomimori

(10) Patent No.: US 8,982,070 B2
(45) Date of Patent: Mar. 17, 2015

(54) PORTABLE INFORMATION TERMINAL

(75) Inventor: Hiroyuki Tomimori, Tokyo (JP)

(73) Assignee: NEC Corporation, Tokyo (JP)

( * ) Notice: Subject to any disclaimer, the term of this patent is extended or adjusted under 35 U.S.C. 154(b) by 62 days.

(21) Appl. No.: 13/505,060

(22) PCT Filed: Sep. 9, 2010

(86) PCT No.: PCT/JP2010/065479
§ 371 (c)(1),
(2), (4) Date: Apr. 30, 2012

(87) PCT Pub. No.: WO2011/052299
PCT Pub. Date: May 5, 2011

(65) Prior Publication Data
US 2012/0218216 A1    Aug. 30, 2012

(30) Foreign Application Priority Data

Oct. 28, 2009  (JP) ................................ 2009-248067

(51) Int. Cl.
*G06F 3/041* (2006.01)
*G06F 3/0488* (2013.01)
*G06F 3/0483* (2013.01)
*G06F 3/14* (2006.01)

(52) U.S. Cl.
CPC .......... *G06F 3/04886* (2013.01); *G06F 3/0483* (2013.01); *G06F 3/0488* (2013.01); *G06F 3/1446* (2013.01); *G06F 2203/04803* (2013.01); *G09G 2354/00* (2013.01)
USPC ........................................... 345/173; 345/1.1

(58) Field of Classification Search
CPC ....................................................... G06F 3/04
USPC .................................................. 345/173–179
See application file for complete search history.

(56) References Cited

U.S. PATENT DOCUMENTS

| | | | |
|---|---|---|---|
| 5,467,102 A | 11/1995 | Kuno et al. | |
| 5,694,150 A * | 12/1997 | Sigona et al. | 715/856 |
| 6,545,669 B1 | 4/2003 | Kinawi et al. | |
| 7,170,468 B2 | 1/2007 | Knopf | |
| 8,347,220 B2 | 1/2013 | Kikuoka | |
| 8,692,735 B2 * | 4/2014 | Kawashimo et al. | 345/1.1 |
| 2002/0021296 A1 | 2/2002 | Tsuji | |
| 2009/0091547 A1 | 4/2009 | Kikuoka | |

(Continued)

FOREIGN PATENT DOCUMENTS

| | | |
|---|---|---|
| CN | 1200189 A | 11/1998 |
| CN | 101404152 A | 4/2009 |

(Continued)

OTHER PUBLICATIONS

International Search Report, PCT/JP2010/065479, Nov. 16, 2010.

(Continued)

*Primary Examiner* — Kevin Nguyen
*Assistant Examiner* — Cory Almeida
(74) *Attorney, Agent, or Firm* — Young & Thompson

(57) ABSTRACT

A display section (2000) that has a plurality of display screens includes: a touch panel type input section (3000) that senses touches on the display screens; and a control section (1000) that causes any one of the two display screens to display a predetermined portion that lies on two display screens of the plurality of display screens based on a touch operation on the display screens.

25 Claims, 16 Drawing Sheets

(56) References Cited

U.S. PATENT DOCUMENTS

| | | | |
|---|---|---|---|
| 2010/0188352 A1* | 7/2010 | Ikeda | 345/173 |
| 2013/0021262 A1* | 1/2013 | Chen | 345/173 |

FOREIGN PATENT DOCUMENTS

| | | |
|---|---|---|
| CN | 101436115 A | 5/2009 |
| JP | 9-258705 | 10/1997 |
| JP | 2000-242393 | 9/2000 |
| JP | 2001-184187 A | 7/2001 |
| JP | 2001-290585 | 10/2001 |
| JP | 2002-006822 | 1/2002 |
| JP | 2002-055753 A | 2/2002 |
| JP | 2002-333930 A | 11/2002 |
| JP | 2005-149322 A | 6/2005 |
| JP | 2005-227579 A | 8/2005 |
| JP | 2007-122649 A | 5/2007 |
| JP | 2008070968 | 3/2008 |
| JP | 2008-203726 A | 9/2008 |
| JP | 2008-216499 | 9/2008 |
| JP | 2009-522669 | 6/2009 |
| JP | 2009-244587 A | 10/2009 |

OTHER PUBLICATIONS

Chinese Office Action dated Feb. 8, 2014; Patent Application No. 201080048152.9.

Japanese Office Action dated May 20, 2014; Application No. 2011-538299.

Extended European Search Report dated Jan. 7, 2014; Application No. 10826434.2.

Japanese Office Action, dated Nov. 26, 2014, in corresponding Japanese Patent Application No. 2011-538299, with partial English translation.

* cited by examiner

PORTABLE INFORMATION TERMINAL

TECHNICAL FIELD

The present invention relates to a portable information terminal provided with a display section and a touch panel type input section integrated therewith.

BACKGROUND ART

Portable information terminals, typified by portable telephone units, PDAs (Personal Digital Assistants), and personal organizers, are generally provided with a display section that is, for example, a liquid crystal display screen that displays text and images; and an input section through which the user inputs commands and data.

Some of portable information terminals use a touch panel type input section. For example, Patent Literature 1 discloses an information terminal that uses a touch panel type input section. The touch panel type input section can increase the display size relative to the device size compared to the case in which a display section and an input section are arranged at different positions.

On the other hand, some of portable information terminals are provided with a display section having a plurality of display screens. For example, a portable information terminal provided with foldable housings each having a display screen has characteristics in which, when used in the folded state, it is small and portable and when used in the spread state, it provides a large screen.

A portable information terminal provided with a plurality of display screens has a boundary that lies therebetween. Thus, if one original image is displayed on a plurality of display screens, since the boundary divides the image into two portions, the image becomes illegible.

Patent Literature 2 discloses a technique that divides one original image into two portions and displays them on two display screens. The technique disclosed in Patent Literature 2 changes the display style of an image depending on its type so as to alleviate such illegibility. The technique disclosed in Patent Literature 2 does not display an original image that lies at the boundary on any one of the two display screens if the image is graphic data, but displays an original image that lies at the boundary portion on any one of the two display screens if the original image is text data.

Patent Literature 3 discloses a technique that improves the visibility of an image on a display screen. The technique disclosed in Patent Literature 3 improves the visibility of a portion of an image that the user wants to watch in such a manner that he or she designates the range of the image to be enlarged. When the user touches two points on a touch panel for a predetermined period of time, the range is designated. When the user slides the two points that he or she is touching, the designated portion is enlarged.

RELATED ART LITERATURE

Patent Literature

Patent Literature 1: JP2009-522669, Publication (Translated version)
Patent Literature 2: JP2002-6822, Publication
Patent Literature 3: JP2001-290585, Publication

SUMMARY OF THE INVENTION

Problem to be Solved by the Invention

However, it is clear that since the technique disclosed in Patent Literature 2 divides an original image into two portions at the boundary of the display screens, the image on the boundary is illegible compared to the case in which the original image is displayed on one display screen.

On the other hand, the technique disclosed in Patent Literature 3 does not consider a boundary that lies between display screens. Thus, an enlarged image designated by the user does not directly improve illegible text on the boundary that lies between the display screens.

An object of the present invention is to provide a technique that improves illegible text on the boundary that lies between display screens of a portable information terminal provided with a plurality of display screens.

Means that Solve the Problem

To accomplish the foregoing object, a portable information terminal according to the present invention includes: a display section that has a plurality of display screens; a touch panel type input section that senses touch on said display screens; and a control section that causes any one of the two display screens to display a predetermined portion that lies on two display screens of said plurality of display screens based on a touch operation on the display screens.

In addition, to accomplish the foregoing object, a display control method according to the present invention includes: detecting a predetermined touch operation on display screens of a portable information terminal having a plurality of display screens and a touch panel type input section that senses touch on the individual display screens; and displaying a predetermined portion, that lies on two display screens of said plurality of display screens, on any one of these two display screens.

In addition, to accomplish the foregoing object, a program according to the present invention causes a computer to execute procedures that includes: detecting a predetermined touch operation on display screens of a portable information terminal having a plurality of display screens and a touch panel type input section that senses touches on the individual display screens; and displaying a predetermined portion, that lies on two display screens of said plurality of display screens, on any one of these two display screens.

Effect of the Invention

According to the present invention, the illegible text that occurs on a boundary that lies between a plurality of display screens with which a portable information terminal is provided can be improved.

BEST MODES THAT CARRY OUT THE INVENTION

A portable information terminal according to each of embodiments of the present invention has two display screens and two touch panels arranged on the individual display screens. The portable information terminal causes the user to designate part of an image that lies at a boundary of display screens (hereinafter this boundary is referred to as the screen boundary) and any one of the two display screens to display only the designated portion.

When the user simultaneously touches both the touch panels on the two display screens, the portable information terminal identifies a portion displayed on any one of the two display screens. When the user slides two points that he or she is simultaneously touching, the portable information terminal causes a display screen to which the two points, that he or she is touching, are slid, to display only the identified portion.

Next, with reference to the accompanying drawings, the present invention will be described in detail.

First Embodiment

When the user simultaneously touches both the touch panels on the two display screens, the portable information terminal according to this embodiment identifies a portion displayed on any one of the two display screens. According to this embodiment, the identified portion is displayed and highlighted. The highlight display process displays an identified portion such that it can be distinguished from other portions. Since the highlight display process is a process that allows the user to easily distinguish an identified portion from the other portions, this process may be omitted.

When the user slides two points that he or she is simultaneously touching, the portable information terminal performs a slide display operation only for the identified portion on a display screen to which he or she has slid the two points. The slide display operation is an operation that causes an identified portion to be displayed on any one of the two display screens.

Figure 1A:
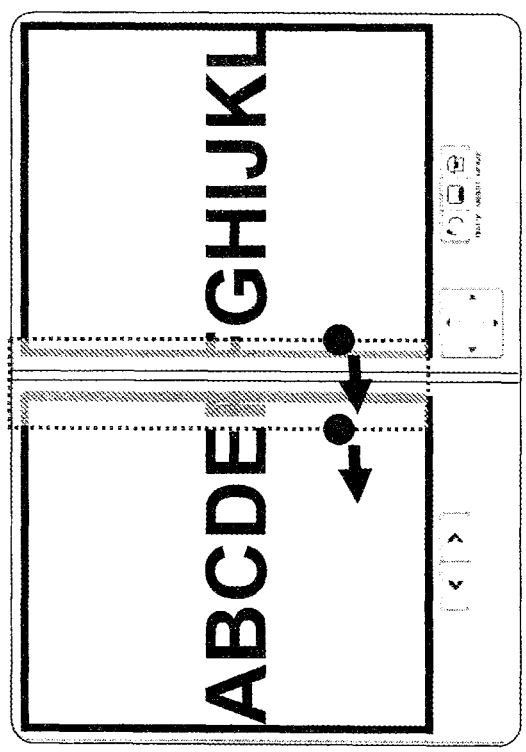
FIG. 1A is a schematic diagram showing an example in which an image is displayed on a portable information terminal having two display screens horizontally arranged.

FIG. 1A is an example in which an image is displayed on a portable information terminal having two display screens horizontally arranged. In the example shown in FIG. 1A, since letter "F" lies at the screen boundary of the two display screens, the letter is divided into two portions and thereby becomes illegible. When the user simultaneously touches two black points shown in FIG. 1A, the portable information terminal identifies a stripe region (a hatched region shown in FIG. 1A) that is surrounded by the two black points and that is formed to match the width of the display screens along the longitudinal direction of the screen boundary as a portion intended to be slid and displayed.

When the user slides the two points that he or she is simultaneously touching in the left direction, the portable information terminal causes the left display screen to display the identified stripe region.

Figure 1B:
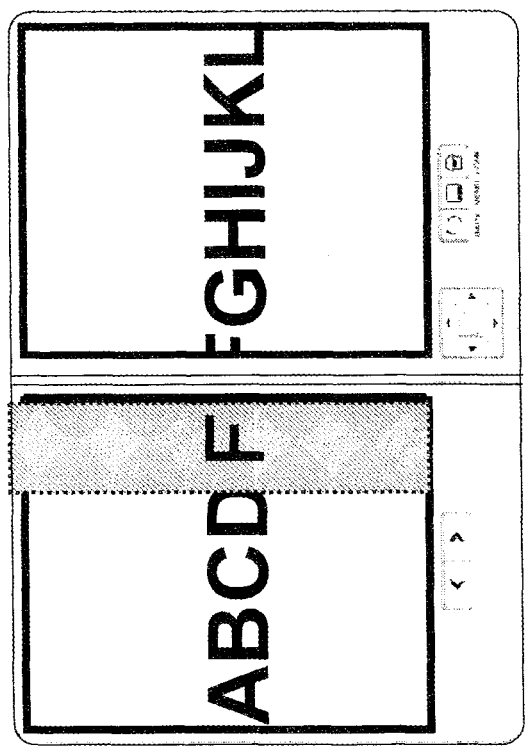
FIG. 1B is a schematic diagram showing an example in which a portion of an image designated by a user is displayed on a left display screen.

FIG. 1B is an example in which an image of a portion designated by the user is displayed on the left display screen. As shown in FIG. 1B, only the hatched portion shown in FIG. 1A is slid and displayed on the left display screen.

Figure 1C:
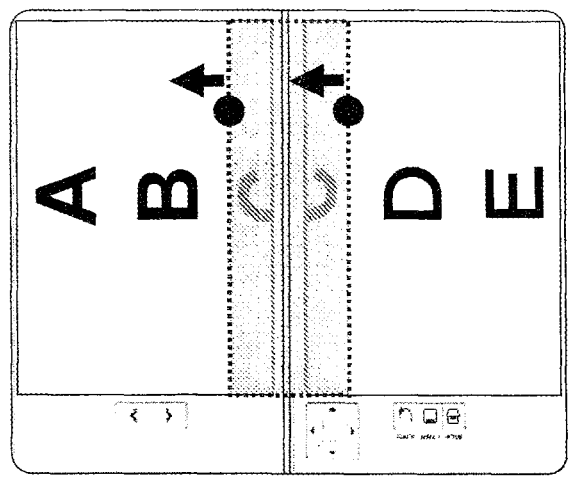
FIG. 1C is a schematic diagram showing an example in which an image is displayed on a portable information terminal having two display screens horizontally arranged.

FIG. 1C shows an example in which an image is displayed on a portable information terminal having two display screens vertically arranged. In the example shown in FIG. 1C, since letter "C" is displayed at the screen boundary of the two display screens, the letter is divided into two portions and thereby becomes illegible. When the user simultaneously touches two black points shown in FIG. 1C, the portable information terminal identifies a stripe region (a hatched portion shown in FIG. 1C) that is surrounded by the two black points and that is formed to match the width of the display screens along the longitudinal direction of the screen boundary as the portion intended to be slid and displayed.

When the user slides the two points that he or she is simultaneously touching in the upper direction, the portable information terminal causes the upper display screen to display the identified stripe region.

Figure 1D:
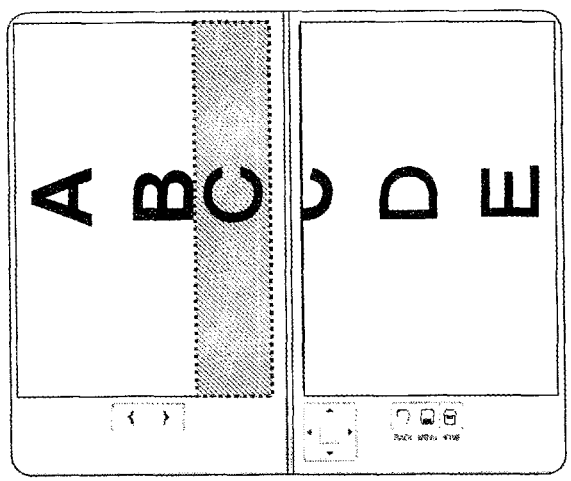
FIG. 1D is a schematic diagram showing an example in which a portion of an image designated by a user is displayed on an upper display screen.

FIG. 1D is an example in which an image of the portion designated by the user is displayed on the upper display screen. As shown in FIG. 1D, only the hatched portion shown in FIG. 1C is slid and displayed on the upper display screen.

Figure 2:
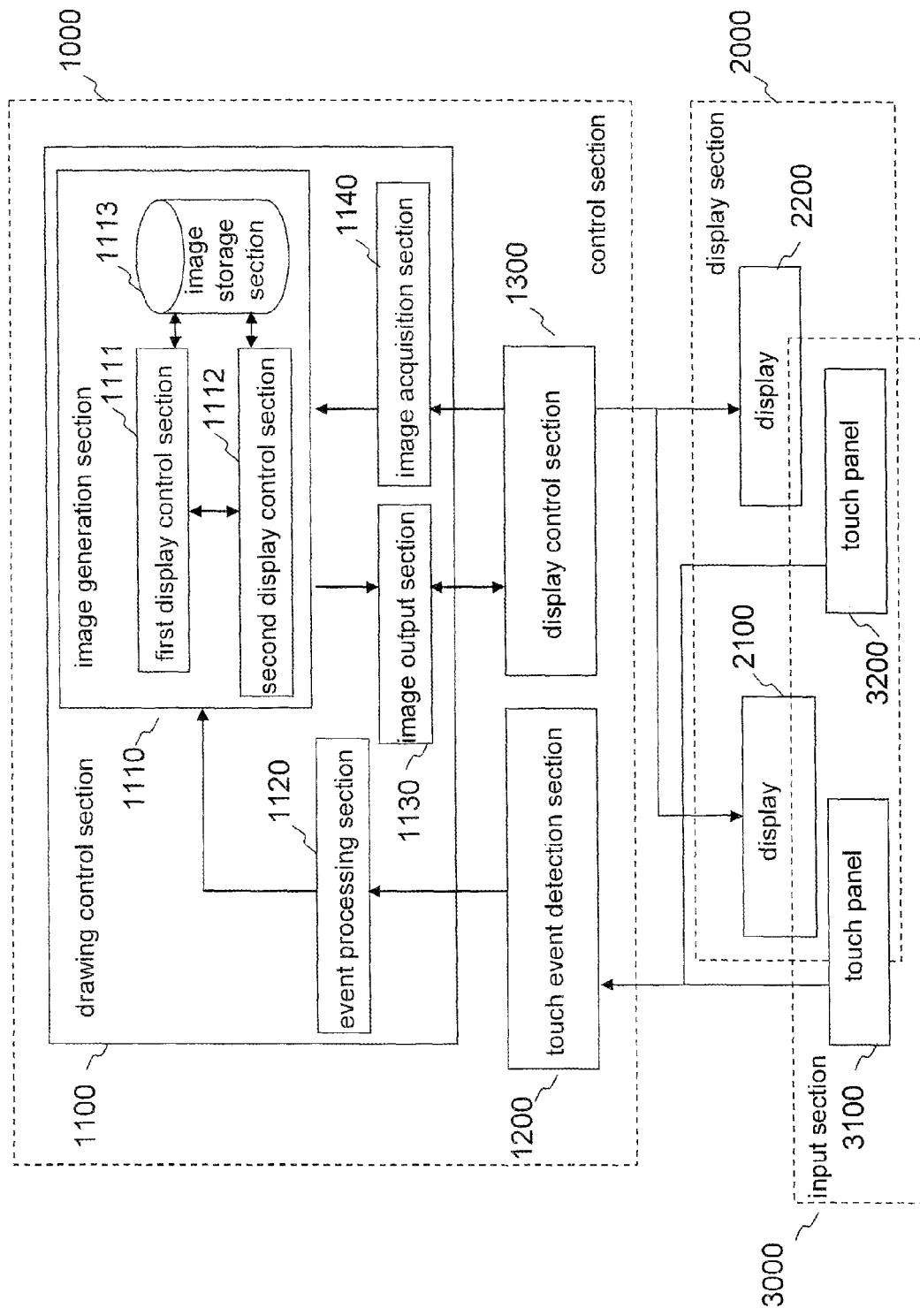
FIG. 2 is a block diagram showing a structure of a portable information terminal according to a first embodiment.

FIG. 2 is a block diagram showing a structure of the portable information terminal according to the first embodiment.

As shown in FIG. 2, the portable information terminal according to the first embodiment has control section 1000, display section 2000, and input section 3000.

Control section 1000 has drawing control section 1100, touch event detection section 1200, and display control section 1300.

Drawing control section 1100 has image generation section 1110, event processing section 1120, image output section 1130, and image acquisition section 1140.

Image generation section 1110 has first display control section 1111, second display control section 1112, and image storage section 1114.

Display section 2000 is a display device having two display screens. Display section 2000 according to this embodiment has display 2100 and display 2200 adjacently arranged with each other. Each display is assigned a display ID (Identification) that is a number with which each display is identified.

Input section 3000 is an input device that has touch panels arranged on the individual display screens. Input section 3000 has touch panel 3100 and touch panel 3200.

Touch panel 3100 is arranged on the screen of display 2100, whereas touch panel 3200 is arranged on the screen of display 2200. Each touch panel is assigned a touch panel ID that is a number with which each touch panel is identified.

Each touch panel detects a touch operation that the user performs and notifies touch event detection section 1200 of touch information that represents the state of the touch operation. Touch information contains information of a touch panel ID of each touch panel, a state that denotes whether or not the touch panel is being touched, and coordinates of a position at which each touch panel is being touched.

Control section 1000 controls the overall operations of the portable information terminal.

Touch event detection section 1200 receives touch information from each touch panel of input section 3000 and generates touch event information based on the received touch information. The touch event information contains a touch panel ID of an event generation source, coordinates of a position at which each touch panel is being touched, an event generation time, and an event type. The event type is information that represents a touch event, that denotes that the touch panel is being touched, a release event that denotes that the user releases his or her fingers from touch panels and a drag event that denotes that the user drags his or her fingers while he or she is touching touch panels.

In addition, touch event detection section 1200 notifies event processing section 1120 of the generated touch event information.

Display control section 1300 causes each display of display section 2000 to display an image corresponding to a request received from image output section 1130.

In addition, display control section 1300 has memory such as a VRAM (Video Random Access Memory) that stores data of an image that is displayed on each display. Moreover, display control section 1300 transmits data of a stored image to image acquisition section 1140 corresponding to a request received therefrom.

Drawing control section 1100 performs a highlight display operation or a slide display operation for an image displayed on each display based on touch event information received from touch event detection section 1200.

Event processing section 1120 acquires touch event information from touch event detection section 1200. In addition, event processing section 1120 analyzes the touch event information acquired from touch event detection section 1200 and performs a process corresponding to each touch event.

When touch events are generated nearly at the same time on two touch panels and the touch events last for a predetermined period of time, event processing section 1120 determines that a touch operation that designates a moving source region of an image intended to be slid and displayed (hereinafter this region is referred to as the slide source region) has been generated. In other words, when the user simultaneously touches the touch panels on the two display screens for a predetermined period of time (for example, ranging from several milliseconds to several hundred milliseconds), the first touch operation can be generated.

When the first touch operation is generated, event processing section 1120 notifies first display control section 1111 of a slide source region designation request that represents a request to designate a slide source region. The slide source region designation request contains the touch panel IDs of the two touch panels on which the touch events have been generated and the coordinates of positions at which the touch panels are been touched. First display control section 1111 decides the slide source region based on information of the touch panel IDs of the two touch panels and the coordinates of the positions at which the touch panels are been touched, the information being contained in the slide source region designation request.

The slide source region is a stripe region that is surrounded by two points that have been touched on the touch panels and that is formed to match the width of the display screens along the longitudinal direction of the screen boundary. The stripe region is a rectangular region in which the length of one side of the stripe region is equal to the length of the screen boundary and the length of the other side of the stripe region is the sum of the distances from each point touched on each touch panel to the screen boundary.

Figure 3:
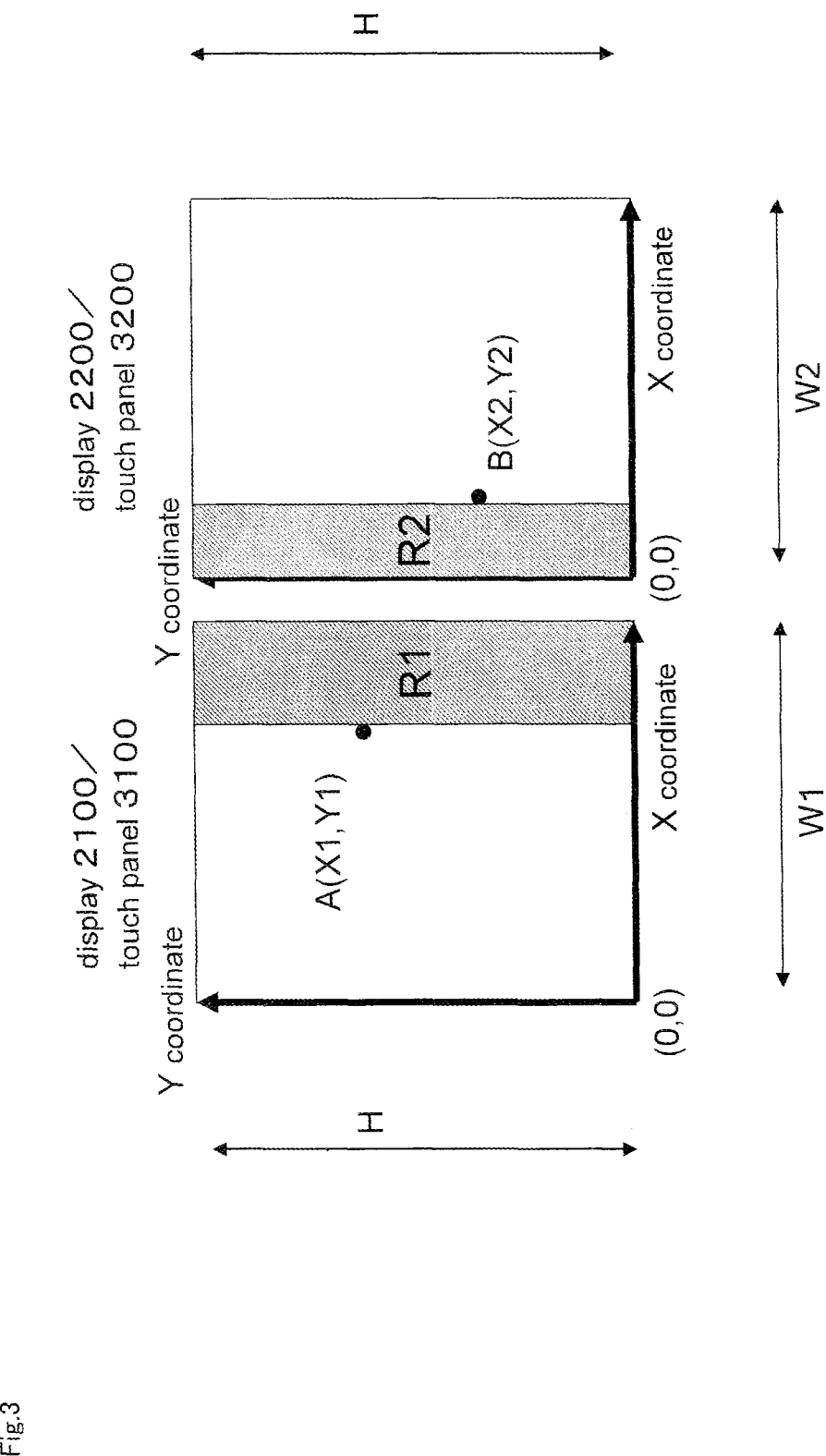
FIG. 3 is a schematic diagram describing an example of a method that decides a slide source region.

FIG. 3 is a schematic diagram describing an example of a method that decides a slide source region. In the example shown in FIG. 3, touch panel 3100 in which the number of pixels in the same direction as the longitudinal direction of the screen boundary is denoted by H and the number of pixels in the direction perpendicular to the longitudinal direction of the screen boundary is denoted by W1 and touch panel 3200 in which the number of pixels in the same direction as the longitudinal direction of the screen boundary is denoted by H and the number of pixels in the direction perpendicular to the longitudinal direction of the screen boundary is denoted by W2 are adjacently arranged.

The following description is based on a coordinate system in which the direction perpendicular to the longitudinal direction of the screen boundary is defined as the X axis and the same direction as the longitudinal direction of the screen boundary is defined as the Y axis. It is assumed that each point in the coordinate system represents a pixel on each touch panel and that the coordinates of the lower left pixel on each touch panel are (0, 0). In this condition, the range of the coordinates of each pixel on touch panel 3100 is $0 \leq X < W1$ and $0 \leq Y < H$. On the other hand, the range of each pixel on touch panel 3200 is $0 \leq X < W2$ and $0 \leq Y < H$.

It is assumed that point A having coordinates (X1, Y1) of touch panel 3100 and point B having coordinates (X2, Y2) of touch panel 3200 are simultaneously being touched.

In this condition, rectangular region R1 surrounded by four points having coordinates (X1, 0), (X1, H−1), (W1−1, 0), (W1−1, H−1) on touch panel 3100 and rectangular region R2 surrounded by four points having coordinates (0, 0), (0, H−1), (X2, 0), and (X2, H−1) become the slide source region.

Touch panel 3100 is arranged on the screen of display 2100 and the coordinates on touch panel 3100 are the same as those on display 2100. Likewise, touch panel 3200 is arranged on the screen of display 2200 and the coordinates on touch panel 3200 are the same as the coordinates on display 2200.

After the first touch operation is generated, when a drag event that contains a component that is equal to or greater than a predetermined amount is generated in the direction perpendicular to the longitudinal direction of the screen boundary on the touch panels of the two display screens, event processing section 1120 determines that a touch operation that designates a display screen on which an image of the slide source region is slid and displayed has been generated (hereinafter this touch operation is referred to as the second touch operation). In other words, when the user slides his or her two fingers that are touching the two touch panels by the first touch operation to any one of the display screens, the second touch operation can be generated.

When the second touch operation is generated, event processing section 1120 notifies first display control section 1111 and second display control section 1112 of a slide display start request that represents a request to start the slide display operation. The slide display start request contains information of touch panel IDs of the two touch panels on which a touch event has been generated and the direction in which the fingers are dragged on the touch panels. Second display control section 1112 decides a display screen on which an image of the slide source region is slid and displayed based on the information of the touch panel IDs of the two touch panels and the direction in which the fingers have been dragged on the touch panels, the information being contained in the slide display start request. A region intended to be slid and displayed on the decided display screen (hereinafter this region is referred to as the slide destination region) is a stripe region in contact with one side of the adjacent display screen and that is formed to match the width of the display screens along the longitudinal direction of the screen boundary.

Figure 4:
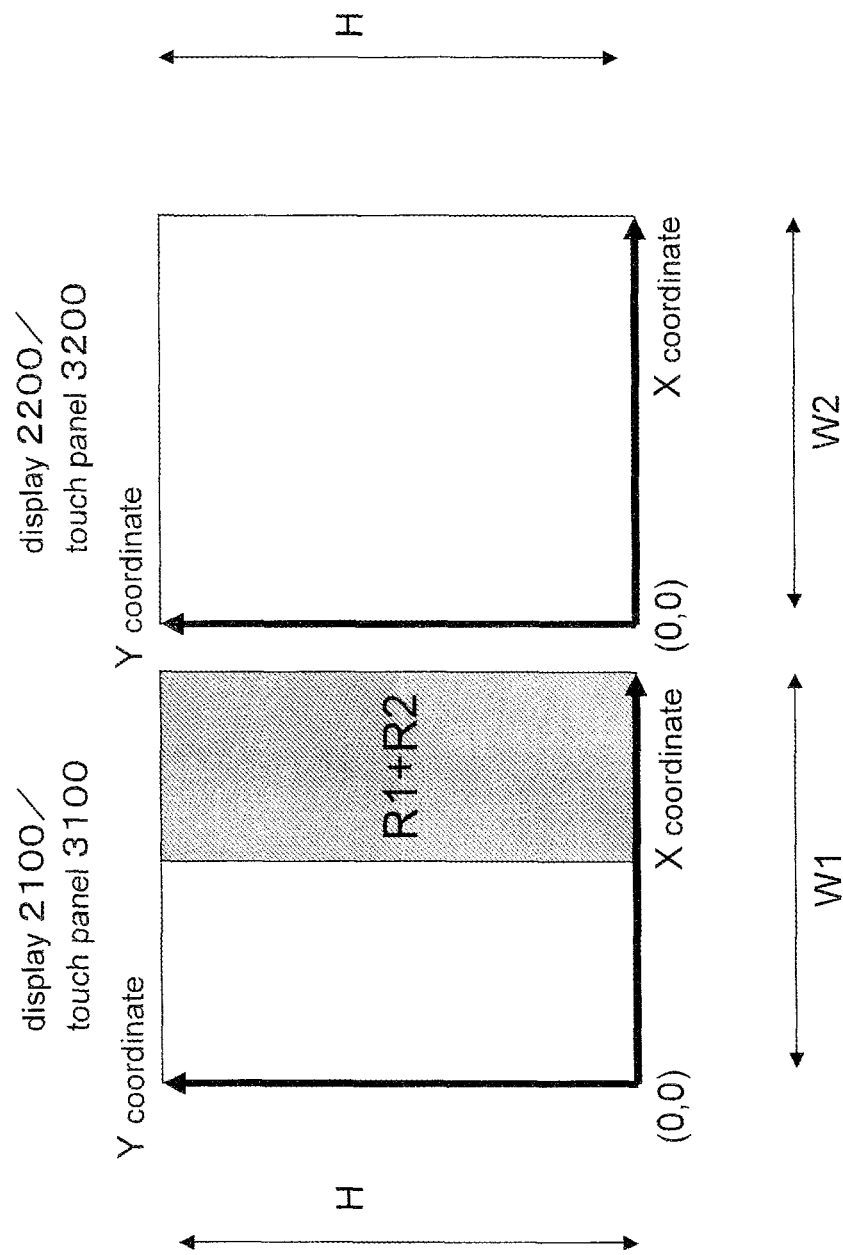
FIG. 4 is a schematic diagram describing an example of a method that decides a slide destination region.

FIG. 4 is a schematic diagram describing an example of a method that decides a slide destination region. The arrangement of the touch panels shown in FIG. 4 is the same as the arrangement of the touch panels shown in FIG. 3.

In this portable information terminal, it is assumed that the fingers that are being touched by the first touch operation are slid in the direction of touch panel 3100.

In this condition, the X coordinate (W1−(W1−X1)−(X2+1)), namely a stripe region on the right of the X coordinate (X1−X2−1) becomes a slide destination region. In other words, a rectangular region surrounded by four points having coordinates (X1−X2−1, 0), (X1−X2−1, H−1), (W1−1, 0), and (W1−1, H−1) becomes a slide destination region.

After the first touch operation is generated, when a release event is generated on any one or both of the touch panels of the two display screens, event processing section 1120 cancels the first touch operation and invalidates the designation of the slide source region. In other words, the user can cancel the first touch operation by releasing his or her fingers that are touching the touch panels by the first touch operation.

After the first touch operation is generated, when a release event is generated on any one or both of the touch panels of the two display screens and a predetermined period of time elapses (for example, several seconds), event processing section 1120 may cancel the first touch operation. Alternatively, when event processing section 1120 has not been notified of a touch event for a predetermined period of time (for example, several seconds), event processing section 1120 may cancel the first touch operation.

When the first touch operation is cancelled, event processing section 1120 notifies first display control section 1111 of a slide source region invalidation request that represents a request to invalidate the designation of the slide source region. The slide source region invalidation request contains the touch panel IDs of the two touch panels on which the touch events have been generated.

After the second touch operation is generated, while two touch panels are being touched by the second touch operation (hereinafter this operation is referred to as the third touch operation), event processing section 1120 determines that the slide display operation should be continued. When a release event is generated on the touch panel of the display screen on which the slide display operation is being performed, event processing section 1120 determines that the third touch operation has been completed and thereby invalidates the designation of the slide destination region. In other words, when the user releases any one or both of his or her fingers slid by the second touch operation, the designation of the slide destination region can be invalidated.

After the third touch operation has been completed and after a predetermined period of time has elapsed (for example, several seconds), event processing section 1120 may invalidate the designation of the slide destination region. Alternatively, when a drag event is generated in the reverse direction of the direction in which the fingers have been slid by the second touch operation, event processing section 1120 may invalidate the designation of the slide destination region.

When event processing section 1120 determines that the designation of the slide destination region should be invalidated, event processing section 1120 notifies second display control section 1112 of a slide display completion request that represents a request to complete the slide display operation. The slide display completion request contains the touch panel IDs of the two touch panels on which a touch event has been generated.

If touch event information received from touch event detection section 1200 is neither the first or second, nor the third touch operations, but designates an object such as an icon, event processing section 1120 notifies an application that manages the object designated in the touch event information of the received touch event information.

First display control section 1111 requests image output section 1130 to output an image generated by first display control section 1111 and intended to be displayed and highlighted to display control section 1300. When first display control section 1111 requests image output section 1130 to output an image, first display control section 1111 transmits an image output request that is a request to output an image to image output section 1130. The image output request contains information of the display ID of the display to which the image is output, the image that is output, and the coordinates of the image displayed on the display.

When image output section 1130 receives the image output request from first display control section 1111, image output section 1130 acquires an image that is currently being displayed on the display assigned the display ID designated in the image output request from display control section 1300. Thereafter, image output section 1130 copies the image designated in the image output request to the region represented by the coordinates designated in the image output request of the image acquired from display control section 1300 and outputs the resultant image to display control section 1300. Display control section 1300 displays and highlights the image received from image output section 1130 on the display screen.

In addition, second display control section 1112 requests image output section 1130 to output an image generated by second display control section 1112 and intended to be slid and displayed to display control section 1300. When second display control section 1112 requests image output section 1130 to output an image, second display control section 1112 transmits an image output request to image output section 1130.

When image output section 1130 receives the image output request from second display control section 1112, image output section 1130 acquires an image that is currently being displayed on the display that has been assigned the display ID designated in the image output request from display control section 1300. Thereafter, image output section 1130 copies the image designated in the image output request to the region of the coordinates designated in the image output request of the image acquired from display control section 1300 and outputs the resultant image to display control section 1300. Display control section 1300 displays the image received from image output section 1130 on the display screen.

When image acquisition section 1140 receives an image acquisition request that represents a request to acquire an image from first display control section 1111, image acquisition section 1140 acquires the requested image of the slide source region from display control section 1300. Thereafter, image acquisition section 1140 transmits the image of the slide source region acquired from display control section 1300 to first display control section 1111. The image acquisition request contains information of the display ID of the display from which the image is acquired and the coordinates on which the acquired image is displayed.

In addition, when image acquisition section 1140 receives an image acquisition request from second display control section 1112, image acquisition section 1140 acquires the requested image of the slide destination region from display control section 1300. Thereafter, image acquisition section 1140 transmits the image of the slide destination region acquired from display control section 1300 to second display control section 1112.

Image generation section 1110 generates and manages an image intended to be displayed and highlighted and an image intended to be slid and displayed.

When first display control section 1111 receives a slide source region designation request from event processing section 1120, first display control section 1111 decides the slide source region based on information of the touch panel IDs of the two touch panels and the coordinates of the positions at which the touch panels are being touched, the information being contained in the received highlight display start request. As described above, the slide source region becomes a stripe region surrounded by two points that have been touched on the touch panels formed to match the width of the display screens along the longitudinal direction of the screen boundary.

When first display control section 1111 decides the slide source region, first display control section 1111 acquires a portion corresponding to the slide source region from the images displayed on display 2100 and display 2200. First display control section 1111 transmits an image acquisition request that designates the portion corresponding to the slide source region of the image displayed on each display to image acquisition section 1140. When first display control section 1111 acquires the portion corresponding to the slide source region of the image displayed on each display from image acquisition section 1140, first display control section 1111 stores each of the acquired images in image storage section 1113.

First display control section 1111 receives the slide source region designation request from event processing section 1120 and decides a slide source region based on information of the touch panel IDs of the two touch panels and the coordinates of the positions at which the individual touch panels are being touched, the information being contained in the received slide source region designation request.

In addition, first display control section 1111 generates an image intended to be displayed and highlighted from a portion corresponding to the slide source region from an image displayed on each display. The highlight display operation is performed, for example, by a red frame that surrounds the slide source region, a blue background of the slide source region, or a 3D (three-dimensional) rendering that shades the slide source region and thereby has the illusion of depth.

First display control section 1111 transmits an image output request that designates the display ID of each display, the portion of the image intended to be displayed and highlighted on each display, and the region corresponding to the slide source region on each display to image output section 1130 so as to perform the highlight display operation on display 2100 and display 2200.

When first display control section 1111 receives the slide display start request from event processing section 1120, first display control section 1111 completes the highlight display operation. To complete the highlight display operation on display 2100 and display 2200, first display control section 1111 transmits an image output request that designates the display ID of each display, the portion corresponding to the slide source region stored in image storage section 1113 and displayed on each display before the highlight display operation is performed, and the region corresponding to the slide source region on each display to image output section 1130.

When first display control section 1111 receives the slide source region invalidation request from event processing section 1120, first display control section 1111 invalidates the designation of the slide source region and completes the highlight display operation. To complete the highlight display operation on display 2100 and display 2200, first display control section 1111 transmits an image output request that designates the display ID of each display, the portion corresponding to the slide source region stored in image storage section 1113 and displayed before the highlight display operation is performed on each display, and the region corresponding to the slide source region on each display to image output section 1130.

When second display control section 1112 receives the slide display start request from event processing section 1120, second display control section 1112 decides a display screen on which the image of the slide source region is intended to be slid and displayed based on information of the touch panel IDs of the two touch panels and the direction in which the fingers are dragged on the individual touch panels, the information being contained in the received slide display start request. As described above, the slide destination region on the decided display screen is a stripe region that is in contact with one side of the adjacent display screen formed to match the width of the display screens along the longitudinal direction of the screen boundary.

Second display control section 1112 transmits an image acquisition request that designates the slide destination region to image acquisition section 1140 so as to acquire a designated image from display control section 1300. When second display control section 1112 acquires the image of the slide destination region, second display control section 1112 stores the acquired image in image storage section 1113.

Second display control section 1112 generates an image intended to be slid and displayed from the image of the slide source region stored in first display control section 1111. When second display control section 1112 slides and displays the image of the slide source region, the slide display operation is performed, for example, by a red frame that surrounds the slide destination region, a blue background of the slide destination region, or a 3D (three-dimensional) rendering that shades the slide destination region and thereby has the illusion of depth so as to distinguish the image of the slide source region from the other portions.

Second display control section 1112 transmits an image output request that designates the display ID of the display for which the slide display operation is performed, the image intended to be slid and displayed, and the slide destination region to image output section 1130 so as to cause image output section 1130 to output the designated image to display control section 1300.

When the second display control section 1112 receives a slide display completion request from event processing section 1120, second display control section 1112 completes the slide display operation. When second display control section 1112 completes the slide display operation, second display control section 1112 transmits an image output request that designates the display ID of the display for which the slide display operation is performed, that designates the image of the slide destination region stored in image storage section 1113 and displayed before the slide display operation is performed, and that designates the slide destination region to image output section 1130 so as to cause image output section 1130 to output the designated image to display control section 1300.

Image storage section 1113 is a storage device that stores the image of the slide source region displayed before the highlight display operation is performed and the image of the slide destination region displayed before the slide display operation is performed.

Next, a process of control section 1000 shown in FIG. 2 that performs the slide display operation will be described.

Figure 5:
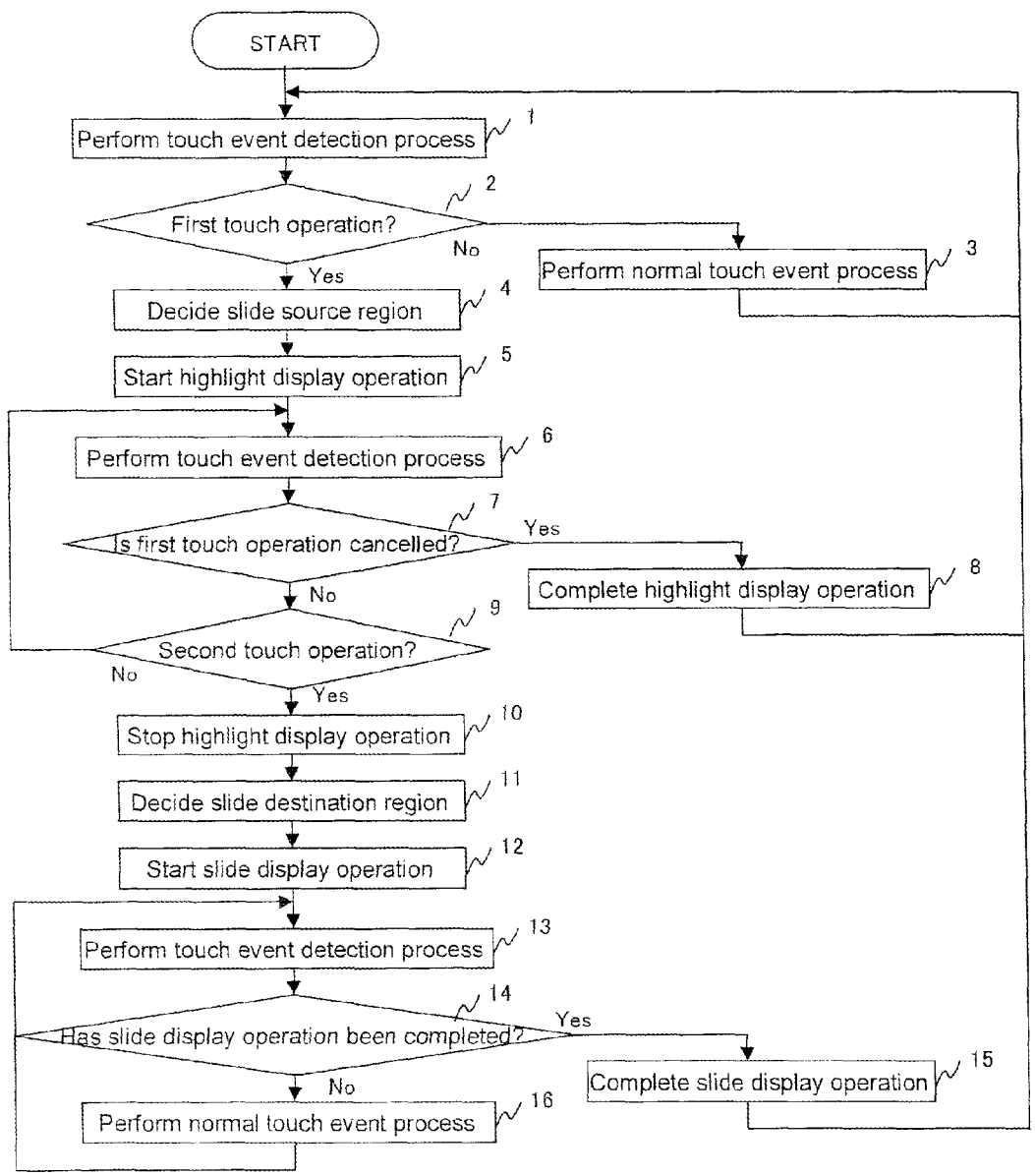
FIG. 5 is a flow chart describing a process in which a control section shown in FIG. 2 performs a slide display operation.

FIG. 5 is a flow chart describing the process in which the control section shown in FIG. 2 performs the slide display operation.

Touch event detection section 1200 waits until it receives touch information from each touch panel of input section 3000. When touch event detection section 1200 receives the touch information at step 1, touch event detection section 1200 generates touch event information based on the received touch information and notifies event processing section 1120 of the generated touch event information.

When event processing section 1120 receives the touch event information from touch event detection section 1200, event processing section 1120 determines whether or not the received touch event information has been caused by the first touch operation at step 2.

When event processing section 1120 determines that the received touch event information has not be caused by the first touch operation, event processing section 1120 performs a normal process, for example, it notifies an application that needs to receive the touch event information of the touch event information at step 3, and then performs the process again from step 1.

If touch events are generated nearly at the same time on the touch panels of the two display screens and the touch events last for a predetermined period of time, event processing section 1120 determines that the received touch event information has been caused by the first touch operation and notifies first display control section 1111 of a slide source region designation request.

When first display control section 1111 receives the slide source region designation request from event processing section 1120, first display control section 1111 decides a slide source region based on information of the touch panel IDs of the two touch panels and the coordinates of the positions at which the individual touch panels are being touched, the information being contained in the received slide source region designation request at step 4.

When first display control section 1111 decides the slide source region, first display control section 1111 acquires the portion corresponding to the slide source region from images displayed on display 2100 and display 2200. First display control section 1111 transmits an image acquisition request that designates the portion corresponding to the slide source region of the image displayed on each display to image acquisition section 1140. When image acquisition section 1140 receives the image acquisition request from first display control section 1111, image acquisition section 1140 acquires the portion corresponding to the slide source region of the image displayed on each display from display control section 1300. Thereafter, image acquisition section 1140 transmits the image acquired from display control section 1300 to first display control section 1111. When first display control section 1111 receives the portion corresponding to the slide source region of the image displayed on each display from image acquisition section 1140, first display control section 1111 stores the acquired images in image storage section 1113.

Thereafter, first display control section 1111 generates an image intended to be displayed and highlighted from the portion corresponding to the slide source region of the image displayed on each display. Thereafter, first display control section 1111 transmits an image output request that designates the display ID of each display, the portion of the image intended to be displayed in highlight on each display, and the slide source region on each display to image output section 1130 so as to perform the highlight display operation on display 2100 and display 2200.

When image output section 1130 receives the image output request from first display control section 1111, image output section 1130 acquires an image that is currently being displayed on the display assigned the display ID designated in the image output request from display control section 1300. Thereafter, image output section 1130 copies the image designated in the image output request to the region represented by the coordinates designated in the image output request of the image acquired from display control section 1300 and outputs the resultant image to display control section 1300. Thereafter, display control section 1300 displays the image received from image output section 1130 on each display screen at step 5.

Thereafter, touch event detection section 1200 waits until it receives touch information from each touch panel of input section 3000. When touch event detection section 1200 receives touch information, touch event detection section 1200 generates touch event information based on the received touch information and notifies event processing section 1120 of the generated touch event information at step 6.

When event processing section 1120 receives the touch event information from touch event detection section 1200, event processing section 1120 determines whether or not the first touch operation should be cancelled based on the received touch event information at step 7. For example, if the received touch event information is a release event caused by the first touch operation, event processing section 1120 determines that the first touch operation should be cancelled.

When event processing section 1120 determines that the first touch operation should be cancelled based on the received touch event information, event processing section 1120 notifies first display control section 1111 of a slide source region invalidation request.

When first display control section 1111 receives the slide source region invalidation request from event processing section 1120, first display control section 1111 invalidates the designation of the slide source region. In addition, first display control section 1111 transmits an image output request that designates the display ID of each display, the portion corresponding to the slide source region of the image stored in image storage section 1113 and displayed on each display before the highlight display operation is performed, and the region corresponding to the slide source region on each display to image output section 1130 so as to complete the highlight display operation on display 2100 and display 2200.

When image output section 1130 receives the image output request from first display control section 1111, image output section 1130 acquires an image that is currently being displayed on each display from display control section 1300. Thereafter, image output section 1130 copies the images displayed before the highlight display operation is performed to the portions corresponding to the slide source regions of the images acquired from display control section 1300 and displayed on the individual displays and outputs the resultant images to display control section 1300. Thereafter, display control section 1300 displays the images received from image output section 1130 on the individual display screens and completes the highlight display operation at step 8. When image output section 1130 completes the highlight display operation, image output section 1130 performs the process from step 1.

In contrast, when event processing section 1120 determines that the first touch operation should not be cancelled based on the received touch event information, event processing section 1120 determines whether or not the received touch event information has been caused by the second touch operation at step 9.

When event processing section 1120 determines that the received touch event information has not been caused by the second touch operation, event processing section 1120 performs the process from step 6 again.

After the first touch operation is generated, when a drag event that contains a component that is equal to or greater than a predetermined amount is generated in the direction perpendicular to the screen boundary on the touch panels of the two display screens, event processing section 1120 determines that the received touch event information has been caused by the second touch operation and notifies first display control section 1111 of a slide display start request.

When first display control section 1111 receives the slide display start request from event processing section 1120, first display control section 1111 transmits an image output request that designates the display ID of each display, the portion corresponding to the slide source region of the image stored in image storage section 1113 and displayed on each display before the highlight display operation is performed, and the portion corresponding to the slide source region on each display to image output section 1130 so as to complete the highlight display operation on display 2100 and display 2200.

When image output section 1130 receives the image output request from first display control section 1111, image output section 1130 acquires an image that is currently being displayed on each display from display control section 1300. Thereafter, image output section 1130 copies images displayed before the highlight display operation is performed to the portions corresponding to the slide source regions of the images acquired from display control section 1300 and displayed on the individual displays and outputs the resultant images to display control section 1300. Display control section 1300 displays the images received from image output section 1130 on the individual display screens and then completes the highlight display operation at step 10.

Thereafter, event processing section 1120 notifies second display control section 1112 of the slide display start request.

When second display control section 1112 receives the slide display start request from event processing section 1120, second display control section 1112 decides a display screen on which the image of the slide source region is intended to be slid and displayed based on information of the touch panel IDs of the two touch panels and the dragging direction on the touch panels, the information being contained in the received slide display start request. In addition, second display control section 1112 decides a slide destination region on the decided display screen at step 11.

When second display control section 1112 decides the display screen for which the slide display operation is performed and the slide destination region, second display control section 1112 transmits an image acquisition request that designates the slide destination region to image acquisition section 1140 so as to acquire an image of the slide destination region. When image acquisition section 1140 receives the image acquisition request from second display control section 1112, image acquisition section 1140 acquires the image of the designated slide destination region from display control section 1300. Thereafter, image acquisition section 1140 transmits the image of the slide destination region acquired from display control section 1300 to second display control section 1112. When second display control section 1112 acquires the image of the slide destination region from image acquisition section 1140, second display control section 1112 stores the acquired image of the slide destination region in image storage section 1113.

Thereafter, second display control section 1112 generates an image intended to be slid and displayed from the image of the slide source region stored by first display control section 1111. Thereafter, second display control section 1112 transmits an image output request that designates the display ID of the display for which the slide display operation is performed, the image intended to be slid and displayed, and the slide destination region to image output section 1130.

When image output section 1130 receives the image output request from second display control section 1112, image output section 1130 acquires an image that is currently being displayed on the display assigned the display ID designated in the image output request from display control section 1300. Thereafter, image output section 1130 copies the image designated in the image output request of the image acquired from display control section 1300 to the region represented by the coordinates designated in the image output request and outputs the resultant image to display control section 1300. When display control section 1300 receives the image intended to be slid and displayed from image output section 1130, display control section 1300 displays the received image on the display screen at step 12.

Thereafter, touch event detection section 1200 waits until it receives touch information from each touch panel of input section 3000. When touch event detection section 1200 receives touch information, touch event detection section 1200 generates touch event information based on the received touch information and notifies event processing section 1120 of the generated touch event information at step 13.

When event processing section 1120 receives the touch event information from touch event detection section 1200, event processing section 1120 determines whether or not the designation of the slide destination region should be invalidated based on the received touch event information at step 14. If the received touch event information is a release event caused by the second touch operation, event processing section 1120 determines that the third touch operation has been complete and thereby determines that the designation of the slide destination region should be invalidated.

When event processing section 1120 determines that the designation of the slide destination region should be invalidated, event processing section 1120 notifies second display control section 1112 of a slide display completion request.

When second display control section 1112 receives the slide display completion request from event processing section 1120, second display control section 1112 transmits an image output request that designates the display ID of the display for which the slide display operation is performed, the image of the slide source region stored in image storage section 1113 and displayed before the slide display operation is performed, and the slide destination region to image output section 1130.

When image output section 1130 receives the image output request from second display control section 1112, image output section 1130 acquires an image being displayed on the display on which the slide display operation is performed from display control section 1300. Thereafter, image output section 1130 copies the image displayed before the slide display operation is performed to the slide destination region of the image acquired from display control section 1300 and outputs the resultant image to display control section 1300. When display control section 1300 receives the image displayed before the slide display operation is performed from image output section 1130, display control section 1300 displays the received image on the display screen and completes the slide display operation at step 15. When display control section 1300 completes the slide display operation, image output section 1130 performs the process from step 1.

In contrast, when the event processing section 1120 determines that the designation of the slide destination region should not been invalidated, event processing section 1120 performs a normal process, for example, it notifies an application that needs to receive the touch event information of the touch event information, and then performs the process from step 13 again.

According to this embodiment, a stripe region formed to match the width of the display screens along the longitudinal direction of the screen boundary is a slide source region. However, the present invention is not limited to such an example. Alternatively, the width of the slide source region in the direction perpendicular to the longitudinal direction of the screen boundary may be identified by touching two points and the width of the slide source region in the same direction as the longitudinal direction of the screen boundary may be predetermined. In this case, the user can freely set the width of the slide source region in the longitudinal direction of the screen boundary.

Alternatively, the width of the slide source region in the direction perpendicular to the longitudinal direction of the screen boundary may be identified by a component of each point that is touched in the direction perpendicular to the longitudinal direction of the screen boundary. In this case, the region of the sum of the rectangular regions on the individual display screens is a slide source region where the length from individual points touched on the two display screens to the screen boundary is the width of the slide source region in the direction perpendicular to the longitudinal direction of the screen boundary.

According to this embodiment, a stripe region surrounded by two points touched on individual touch panels formed to match the width of the display screens along the longitudinal direction of the screen boundary is a slide source region. However, the present invention is not limited to such an example. Alternatively, a predetermined region may be designated as a slide source region regardless of the coordinates of two points that are touched. In this case, the user can freely set a slide source region. Further alternatively, a slide source region may be a region in any shape other than a rectangular region.

According to this embodiment, when the portable information terminal performs the slide display operation, the image of a slide source region is still displayed. However, the present invention is not limited to such an example. Alternatively, when the portable information terminal performs the slide display operation, the portable information terminal may display an image of the slide source region in white.

According to this embodiment, the portable information terminal performs the highlight display operation such that an image of the slide source region can be distinguished from other portions. However, the present invention is not limited to such an example. Since an image of the slide source region does not always need to be distinguished from the other portions, the highlight display process may be omitted.

According to this embodiment, the first, second, and third touch operations are touch operations simultaneously performed on both touch panels arranged on two adjacent display screens. However, the present invention is not limited to such an example. Alternatively, each touch operation may be any operation, for example an operation performed only on one touch panel.

According to this embodiment, display section 2000 has two display screens. However, the present invention is not limited to such an example. Alternatively, display section 2000 may have three or more display screens.

According to this embodiment, the input section of the portable information terminal is composed of touch panels arranged on display screens. However, the present invention is not limited to such an example. Alternatively, the input section of the portable information terminal may be of any type as long as it can sense a touch on a display screen. Further alternatively, the input section of the portable information terminal may be a sensor that detects a touch and that is housed in a display panel.

As described above, according to this embodiment, the portable information terminal displays a part of an image that lies at the screen boundary on any one of the display screens. As a result, the portable information terminal can improve illegibility.

In addition, the portable information terminal according to this embodiment performs the slide display operation regardless of the function and type of application that runs thereon. Thus, even if an application that has a scroll function and an application that does not coexist in the portable information terminal according to this embodiment, since it can perform the slide display operation and thereby provide the use with convenience.

In addition, the portable information terminal according to this embodiment identifies the width of a slide source region in the direction perpendicular to the longitudinal direction of the screen boundary by touching two points. Thus, the user can visually identify his or her desired region and designate it as a portion intended to be slid and displayed.

In addition, the portable information terminal according to this embodiment identifies the width of the slide source region in the direction perpendicular to the longitudinal direction to the screen boundary based on a component of each point touched in the direction perpendicular to the longitudinal direction of the screen boundary. As a result, the user can more intuitionally identify a portion for which the slide display operation is performed.

In addition, the portable information terminal according to this embodiment designates the width of the slide source region in the same direction as the longitudinal direction of the screen boundary, as a predetermined length. As a result, the user can freely set the width of the slide source region in the same direction as the longitudinal direction of the screen boundary.

In addition, the portable information terminal according to this embodiment designates a stripe region surrounded by two points touched on individual touch panels formed to match the width of the display screens along the longitudinal direction of the screen boundary as a portion intended to be slid and displayed. Thus, the user can easily identify a portion intended to be slid and displayed.

In addition, the portable information terminal according to this embodiment designates a predetermined region as a region for which the slide display operation is performed. As a result, the user can freely set the slide source region.

In addition, when touch panels on two display screens are simultaneously touched, the portable information terminal according to this embodiment identifies a portion intended to be slid and displayed, whereas when the touch operation that slides the two touched points is performed, the portable information terminal displays the identified portion on the display screen to which the identified portion is slid. As a result, the user can easily perform the slide operation.

In addition, when the user intends to perform the slide display operation and releases his or her fingers from the touch panels or when he or she intends to do that and release his or her fingers from the touch panels and then a predetermined period of time elapses, the portable information terminal according to this embodiment automatically completes the slide display operation. As a result, the user can complete the slide display operation without necessity of performing any special operation.

In addition, the portable information terminal according to this embodiment displays the frame or background of an original image intended to be slid and displayed or an image that is slid and displayed in color or 3D so as to distinguish the image from other portions. As a result, the portable information terminal can improve the visibility of an image for the user.

Second Embodiment

According to the first embodiment, the portable information terminal slides part of an image that lies on a plurality of display screens on any one of the display screens. According to a second embodiment of the present invention, an object contained in an image that is slid and displayed on a display screen can be touched.

When a portion that is slid and displayed is operated on the portable information terminal, the object designated in this operation needs to coincide with an image that is slid and displayed. Thus, according to this embodiment, when an image that is slid and displayed is touched (hereinafter this touch operation is referred to as the fourth touch operation), the portable information terminal converts the coordinates of the touched position into the coordinates of the original region. Thereafter, the portable information terminal notifies an application that manages the object designated by the fourth touch operation of information of the converted coordinates.

The basic structure of the portable information terminal according to the second embodiment is the same as the basic structure of the portable information terminal according to the first embodiment.

However, event processing section 1120 does not determine that the designation of a slide destination region should be invalidated immediately after the third touch operation has been completed while the slide display operation is being performed. When the third touch operation has been completed and then a predetermined period of time elapses, event processing section 1120 determines that the designation of the slide destination region should be invalidated. The predetermined period of time is one during which the user can perform the next touch operation, for example from several seconds to several tens of seconds.

If touch event information received from touch event detection section 1200 is neither the first, second, nor third touch operation, but if designates an object such as an icon, event processing section 1120 notifies an application that manages the object designated in the touch event information.

When event processing section 1120 receives the touch event information from touch event detection section 1200, event processing section 1120 determines whether or not the slide display operation is being performed and whether or not the received touch event information has been caused by the fourth touch operation. When event processing section 1120 receives the touch event information caused by the fourth touch operation while the slide display operation is being performed, event processing section 1120 converts the coordinates on the touch panel contained in the received touch event information into the coordinates of the slide source region. Thereafter, event processing section 1120 notifies the application that manages the object designated in the touch event information of the touch event information in which the coordinates on the touch panel have been converted.

Next, a process in which the control section according to the second embodiment performs the slide display operation will be described.

Figure 6:
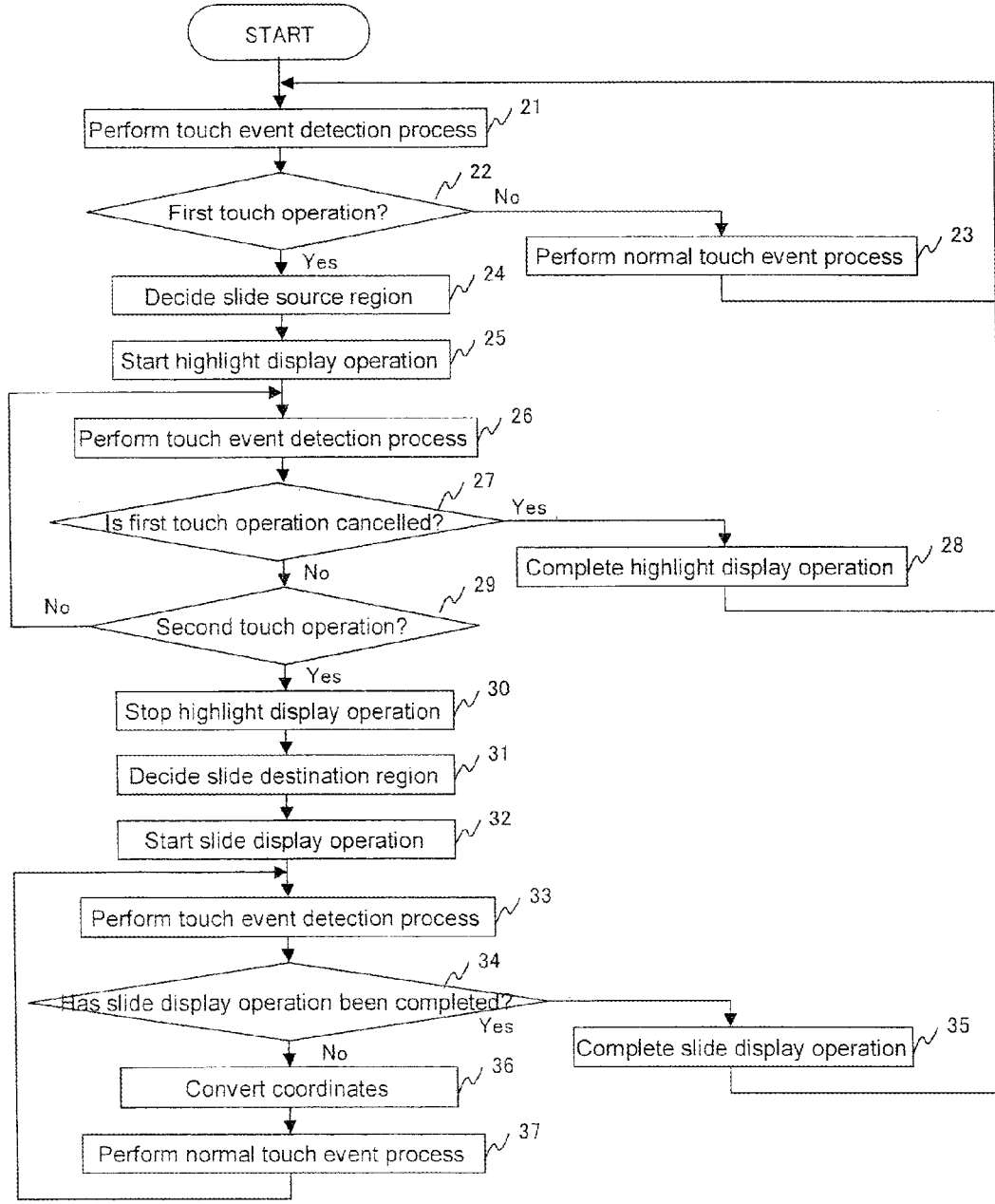
FIG. 6 is a flow chart describing a process in which a control section according to a second embodiment performs a slide display operation.

FIG. 6 is a flow chart describing a process in which the control section according to the second embodiment performs the slide display operation.

The process from step 21 to step 35 is basically the same as the process from step 1 to step 15 described with reference to FIG. 6.

However, even if event processing section 1120 determines that the third touch operation has been completed, event processing section 1120 does not immediately determine that the designation of the slide destination region should be invalidated at step 34. Instead, when the third touch operation has been completed and then after a predetermined period of time elapses, event processing section 1120 determines that the designation of the slide destination region should be invalidated.

When event processing section 1120 receives touch event information from touch event detection section 1200 while the slide display operation is being performed, event processing section 1120 determines whether or not the received touch event information has been caused by the fourth touch operation.

When event processing section 1120 determines that the received touch event information has been caused by the fourth touch operation, event processing section 1120 converts the coordinates on the touch panel contained in the received touch event information into the coordinates of the slide source region at step 36. Thereafter, at step 37, event processing section 1120 notifies the application that manages the object designated in the touch event information of the touch event information in which the coordinates of the touch panel have been converted and then performs the process from step 33 again.

In contrast, when event processing section 1120 determines that the received touch event information has not been caused by the fourth touch operation, event processing section 1120 notifies the application that manages the object designated in the touch event information of the received touch event information, as is, without converting the coordinates of the touch panel.

As described above, according to this embodiment, when a portion that is slid and displayed is touched, the portable information terminal converts the coordinates of the touched position into the coordinates of the original region and notifies the application that manages the object designated by the touch operation of the coordinates. As a result, the portable information terminal can adequately notify the application of a user's operation performed on a screen after the slide display operation is performed and thereby improve its usability for the user.

When the user causes an object to be slid and displayed so as to give a predetermined command to the object that lies at the screen boundary, after he or she gives the predetermined command to the object, it is not necessary to continuously slide and display the object. Thus, when the fourth touch operation is performed, without necessity of an elapse of a predetermined period of time after the third touch operation has been performed, the portable information terminal may invalidate the designation of the slide destination region and complete the slide display operation. As a result, the portable information terminal can provide the user with improved convenience.

Third Embodiment

According to the first embodiment, the slide source region is formed to match the width of the display screens along the longitudinal direction of the screen boundary. However, the present invention is not limited to such an example. Alternatively, the width of the slide source region in the same direction as the longitudinal direction of the screen boundary may be identified by two points touched on individual touch panels. According to the third embodiment, the slide source region is for example a rectangular region having diagonal vertexes given by two points touched on individual touch panels.

Figure 7A:
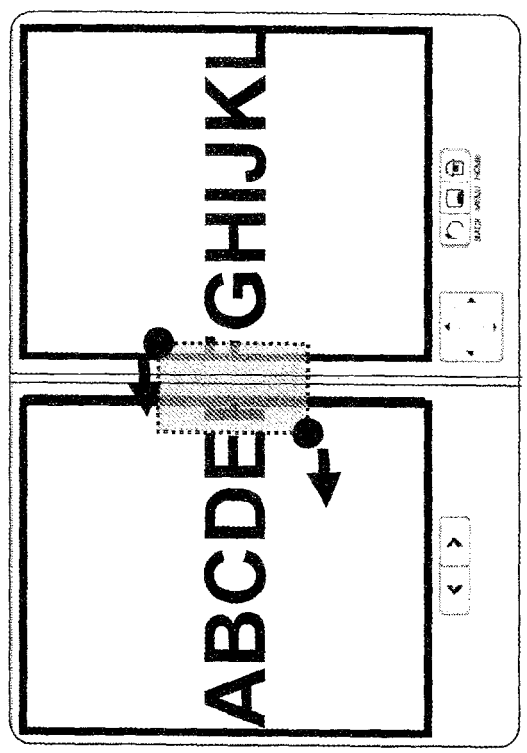
FIG. 7A is a schematic diagram showing an example in which an image is displayed on a portable information terminal having two display screens horizontally arranged.

FIG. 7A is an example in which an image is displayed on a portable information terminal having two display screens horizontally arranged. When the user simultaneously touches two black points shown in FIG. 7A, the portable information terminal identifies a rectangular region (a hatched portion shown in FIG. 7A) having diagonal vertexes given by the two black points as a portion intended to be slid and displayed.

When the user slides the two points that he or she is simultaneously touching in the left direction, the portable information terminal causes the left display screen to display the identified rectangular region.

Figure 7B:
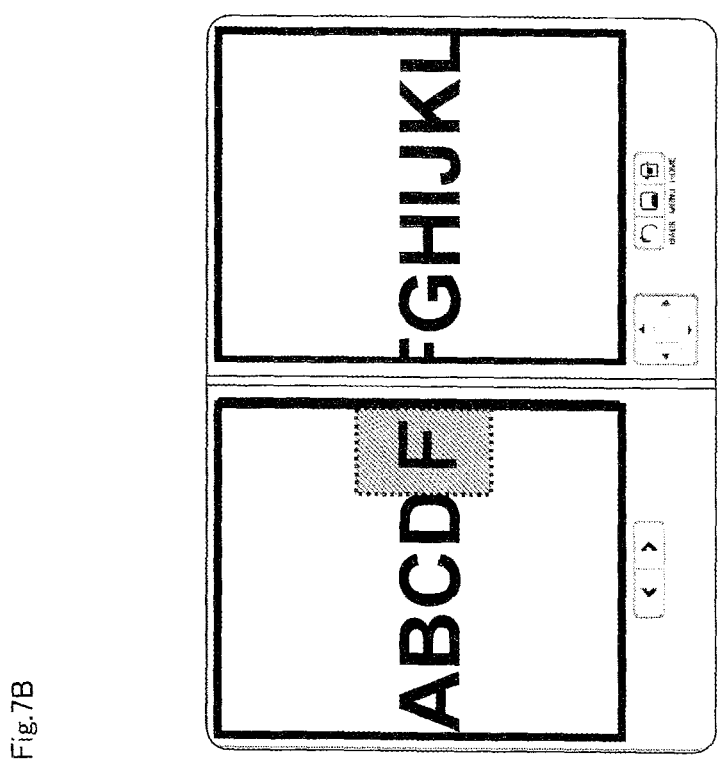
FIG. 7B is a schematic diagram showing an example in which an image of a designated rectangular area is displayed on a left display screen.

FIG. 7B is an example in which an image of an identified rectangular region is displayed on one display screen. As shown in FIG. 7B, only the hatched portion shown in FIG. 7A is slid and displayed on the left display screen.

The basic structure of the portable information terminal according to the third embodiment is the same as the basic structure of the portable information terminal according to the first embodiment.

However, event processing section 1120 according to the third embodiment designates a rectangular region having diagonal vertexes given by two points touched on individual touch panels as a slide source region.

Figure 8:
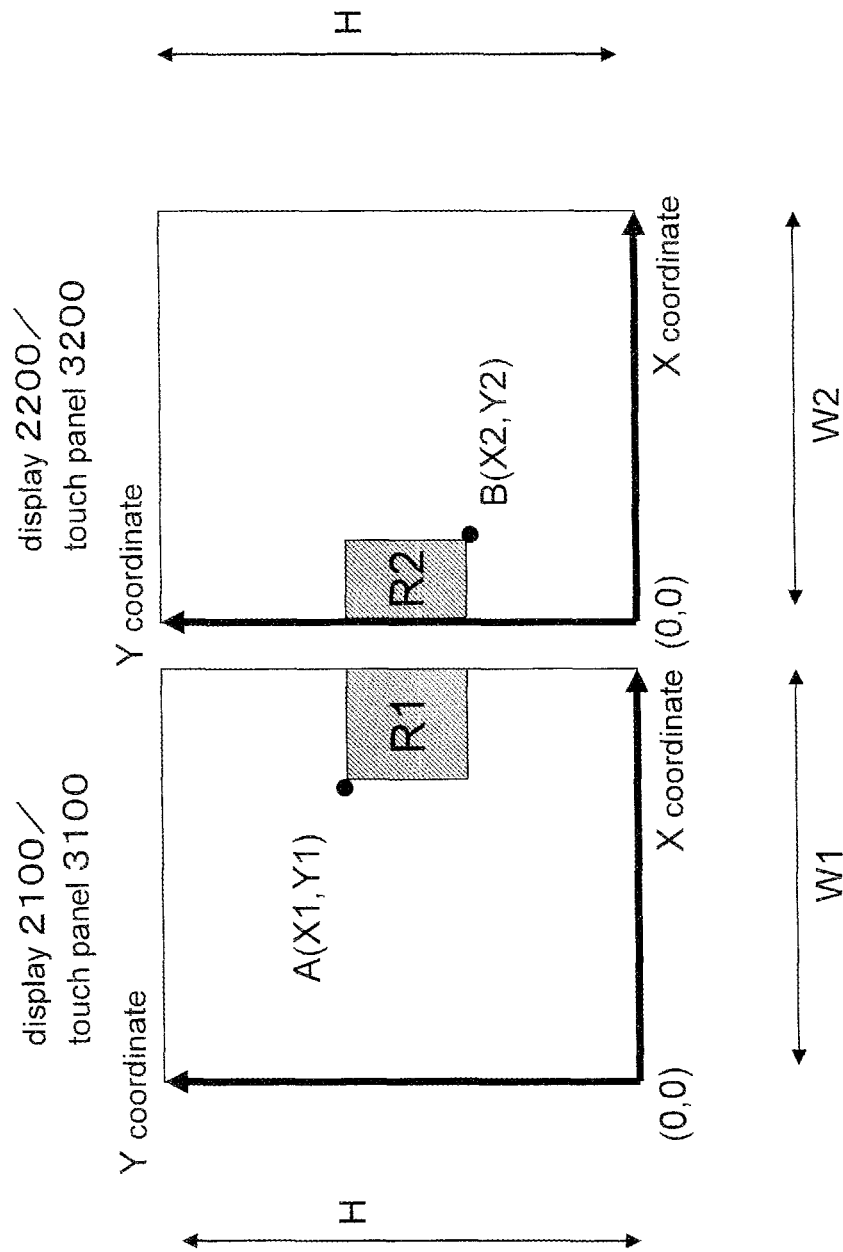
FIG. 8 is a schematic diagram describing an example of a method that decides a slide source region according to a third embodiment.

FIG. 8 is a schematic diagram describing an example of a method that decides a slide source region according to the third embodiment. In the example shown in FIG. 8, touch panel 3100, in which the number of pixels in the same direction as the longitudinal direction of the screen boundary is denoted by H and in which the number of pixels in the direction perpendicular to the longitudinal direction of the screen boundary is denoted by W1, and touch panel 3200, in which the number of pixels in the same direction as the longitudinal direction of the screen boundary is denoted by H, and in which the number of pixels in the direction perpendicular to the longitudinal direction of the screen boundary is denoted by W2, are adjacently arranged.

The following description is based on a coordinate system in which the direction perpendicular to the longitudinal direction of the screen boundary is defined as the X axis and in which the same direction as the longitudinal direction of the screen boundary is defined as the Y axis. It is assumed that each point in the coordinate system represents a pixel on each touch panel and that the coordinates of the lower left pixel on each touch panel are (0, 0). In this condition, the range of the coordinates of pixels on touch panel 3100 is 0≤X<W1 and 0≤Y<H. On the other hand, the range of pixels on touch panel 3200 is 0≤X<W2 and 0≤Y<H.

It is assumed that point A having coordinates (X1, Y1) of touch panel 3100 and point B having coordinates (X2, Y2) of touch panel 3200 are simultaneously being touched.

In this condition, rectangular region R1 surrounded by four points having coordinates (X1, Y1), (X1, Y2), (W1−1, Y1), and (W1−1, Y2) on touch panel 3100 and rectangular region R2 surrounded by four points having coordinates (0, Y1), (0, Y2), (X2, Y1), and (X2, Y2) become a slide source region.

Second display control section 1112 according to the third embodiment designates a rectangular region in which the slide source region is slid on the display screen in the slide direction by the second touch operation such that the slide source region is in contact with one side of the adjacent display screen in the direction perpendicular to the longitudinal direction of the screen boundary as the slide destination region.

Figure 9:
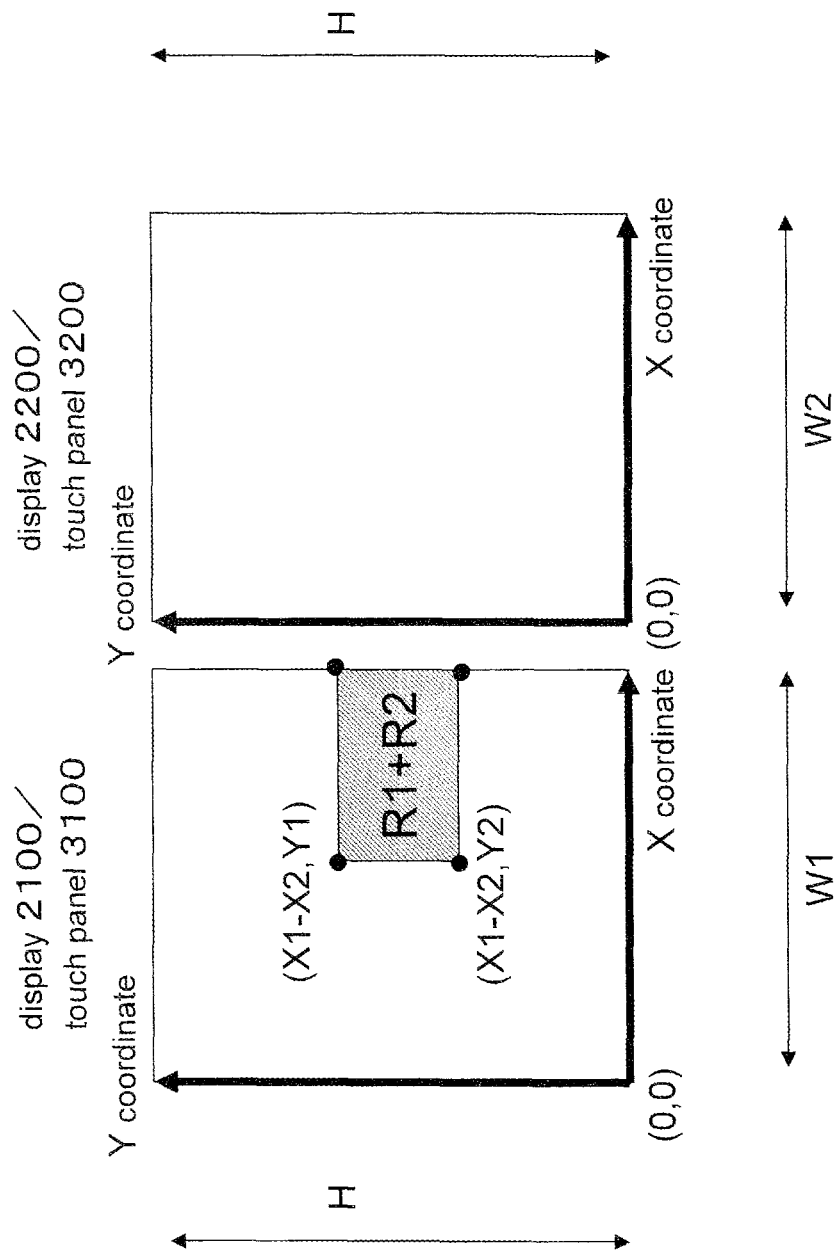
FIG. 9 is a schematic diagram describing an example of a method that decides a slide destination region according to the third embodiment.

FIG. 9 is a schematic diagram describing an example of a method that decides a slide destination region according to the third embodiment. The arrangement of the touch panels shown in FIG. 9 is the same as the arrangement of the touch panels shown in FIG. 8.

It is assumed that fingers touched by the first touch operation are slid to touch panel 3100.

In this case, a rectangular region surrounded by four points having coordinates (X1−X2−1, Y1), (X1−X2−1, Y2), (W1−1, Y1), and (W1−1, Y2) becomes a slide destination region.

This embodiment presents an example in which a rectangular region having diagonal vertexes given by two points touched on individual touch panels is a portion intended to be slid and displayed. However, the present invention is not limited to such an example. Alternatively, the portion intended to be slid and displayed may be any region as long as it can be identified by two points touched on individual touch panels. For example, the width of the display screen in the same direction as the longitudinal direction of the screen boundary may be predetermined and the width of the display screens in the direction perpendicular to the longitudinal direction of the screen boundary may be a portion intended to be slid and displayed for a region designated by two points that are touched. Alternatively, the width of the display screens in the direction perpendicular to the longitudinal direction of the screen boundary may be predetermined and the width of the display screen in the same direction as the longitudinal direction of the screen boundary may be a portion intended to be slid and displayed for a region designated by two points that are touched.

Alternatively, the region identified by two points may be a region in any shape other than a rectangular region. For example, the region identified by two points may be a circular region having a diameter given by two points touched on individual touch panels.

As described above, according to this embodiment, the portable information terminal designates a rectangular region having diagonal vertexes given by two points touched on individual touch panels as a slide source region. As a result, the user can designate a range intended to be slid and displayed both in the same direction as the longitudinal direction of the screen boundary and the direction perpendicular to the longitudinal direction of the screen boundary and thereby improve its usability for the user.

The first embodiment presents an example in which a stripe region formed to match the width of the display screens along the longitudinal direction of the screen boundary is designated as a portion intended to be slid and displayed. In addition, the third embodiment presents an example in which a rectangular region having diagonal vertexes given by two points touched on individual touch panels is designated as a portion intended to be slid and displayed. However, the present invention is not limited to such examples. For example, a portion intended to be slid and displayed may be only a UI (User Interface) component such as an icon.

The portable information terminal may designate only a component that lies in a stripe region surrounded by two points touched on individual touch panels formed to match the width of the display screens along the longitudinal direction of the screen boundary as a portion intended to be slid and displayed. Alternatively, the portable information terminal may designate only a component that lies in a stripe region always having a constant width in the direction perpendicular to the longitudinal direction of the screen boundary formed to match the width of the display screens along the longitudinal direction of the screen boundary as a portion intended to be slid and displayed. Alternatively, the portable information terminal may designate only a component that lies in a rectangular region having diagonal vertexes given by two points touched on individual touch panels as a portion intended to be slid and displayed.

Thus, the user can designate a portion intended to be slid and displayed for each component and thereby the portable information terminal can improve its usability for the user.

Fourth Embodiment

Although the first embodiment and the second embodiment present examples in which a slide source region is displayed by sliding it in the direction perpendicular to the longitudinal direction of the screen boundary, the present invention is not limited to such an example. Alternatively, a region that is displayed may be slid in the same direction as the longitudinal direction of the screen boundary such that the user can easily see it. According to the fourth embodiment, an example in which a slide source region is displayed by sliding it in a diagonal direction of the screen boundary.

Figure 10A:
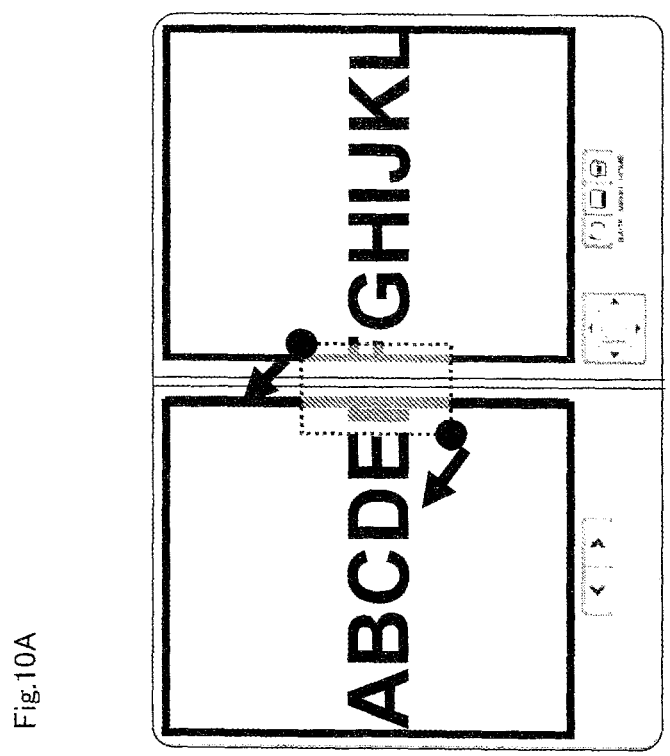
FIG. 10A is a schematic diagram showing an example in which an image is displayed on a portable information terminal having two display screens horizontally arranged.

FIG. 10A is an example in which an image is displayed on a portable information terminal having two display screens horizontally arranged. When the user simultaneously touches two black points shown in FIG. 10A, the portable information terminal identifies a rectangular region having diagonal vertexes given by two black points (a hatched portion shown in FIG. 10A) as a portion intended to be slid and displayed.

When the user slides the two points that he or she is simultaneously touching in an upper left direction, the portable information terminal slides the identified rectangular region in the upper left direction and displays the rectangular region.

Figure 10B:
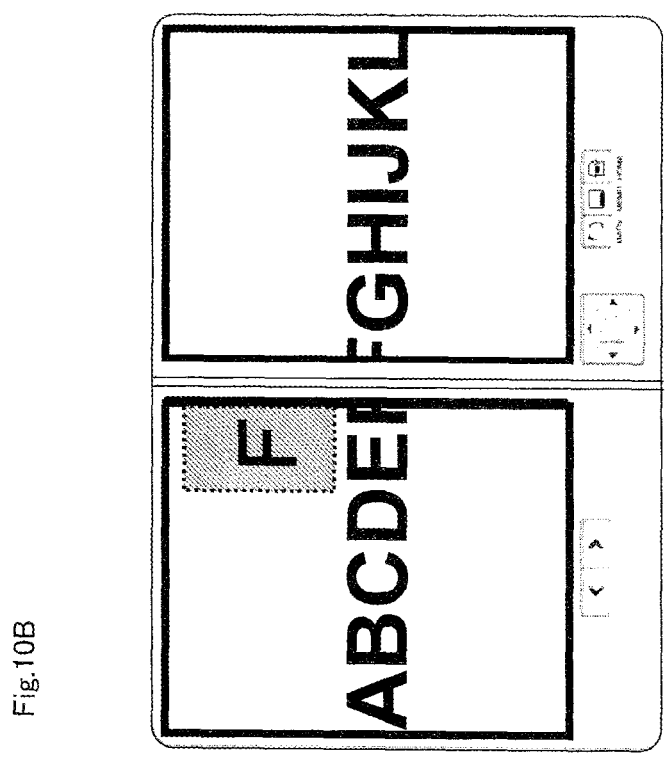
FIG. 10B is a schematic diagram showing an example in which an image of a designated rectangular region is slid in an upper left direction and displayed.

FIG. 10B is an example in which an identified rectangular region is slid in the upper left direction and displayed. As shown in FIG. 10B, when the user slides the two points that he or she is simultaneously touching in the upper left direction, the hatched portion shown in FIG. 10A is slid in the upper left direction and displayed.

The basic structure of the portable information terminal according to the fourth embodiment is the same as that of the portable information terminal according to the first embodiment.

However, second display control section 1112 according to the fourth embodiment decides a slide destination region based on the distances for which two points touched by the first touch operation are slid in the same direction as the longitudinal direction of the screen boundary by the second touch operation.

Second display control section 1112 decides a display screen on which an image of a slide source region is slid and displayed based on information of the dragging direction on individual touch panels, the information being contained in a slide display start request received from event processing section 1120. In addition, second display control section 1112 computes an average value of the distances for which the two points that have been touched by the first touch operation have been slid in the direction perpendicular to the longitudinal direction of the screen boundary by the second touch operation. Second display control section 1112 designates a region that is in contact with one side of a display screen on which an image of the slide source region is decided to be slid and displayed and that is slid in the same direction as the longitudinal direction of the screen boundary for the computed average value as the slide destination region.

Figure 11:
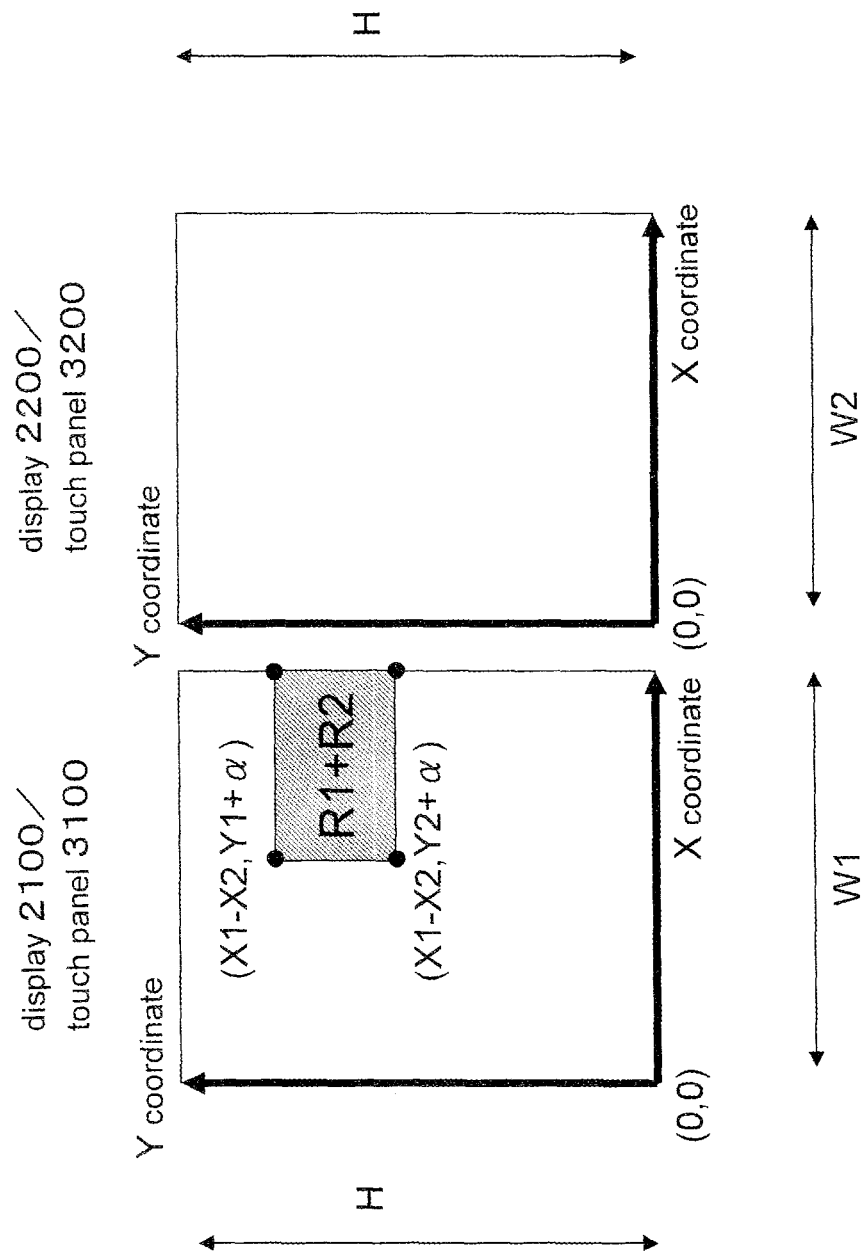
FIG. 11 is a schematic diagram describing an example of a method that decides a slide destination region according to a fourth embodiment.

FIG. 11 is a schematic diagram describing an example of a method that decides a slide destination region according to the fourth embodiment. The arrangement of the touch panels shown in FIG. 11 is the same as the arrangement of the touch panels shown in FIG. 8.

It is assumed that fingers touched by the first touch operation are slid in the upper left direction and the average value of the distances for which the two points touched by the first touch operation are slid in the direction of the Y axis by the second touch operation is a. In this case, a rectangular region surrounded by four points having coordinates (X1−X2−1, Y1+α), (X1−X2−1, Y2+α), (W1−1, Y1+α), and (W1−1, Y2+α) is a slide destination region.

This embodiment presents an example in which a slide source region is a rectangular region having diagonal vertexes given by two points touched on individual touch panels. However, the present invention is not limited to such an example. Even if the slide source region is a stripe region formed to match the width of the display screens along the longitudinal direction of the screen boundary as presented in the first embodiment, the slide source region may be slid in the same direction as the longitudinal direction of the screen boundary and displayed.

As described above, according to this embodiment, the portable information terminal also slides a slide source region also in the same direction as the longitudinal direction of the screen boundary and displays the slide source region as two points slid by the second touch operation and that are moved in the same direction as the longitudinal direction of the screen boundary. As a result, the user can slide the slide source region in the same direction as the longitudinal direction of the screen boundary and displays the slide source region and thereby the portable information terminal can improve its visibility for the user.

The process in which each constituent element with which the foregoing portable information terminal is provided may be performed by a logic circuit produced corresponding to its object. Alternatively, a program that has recorded process content may have been recorded on a recording medium from which the portable information terminal can read. The program recorded on the recording medium may be read to the portable information terminal and executed thereby. Recording mediums from which the portable information terminal can read include movable recording mediums such as floppy (registered trademark) disks, and magneto-optical discs, memory for example ROM and RAM built in the portable information terminal, and HDDs. The program recorded on such a recording medium is read by a CPU (not shown) with which the portable information terminal is provided and the same process as described above is performed under the control of the CPU. In this case, the CPU operates as a computer that executes the program that is read from the recording medium on which the program is recorded.

The present invention has been described with reference to the embodiments. However, it should be understood by those skilled in the art that the structure and details of the present invention may be changed in various manners without departing from the scope of the present invention.

The present application claims priority based on Japanese Patent Application JP 2009-248067 filed on Oct. 28, 2009, the entire contents of which are incorporated herein by reference in its entirety.

The invention claimed is:

1. A portable information terminal, comprising:
   a display section that has a plurality of display screens and that displays an image on the plural display screens;
   a touch panel type input section that senses a first touch operation on said display screens and identifies a predetermined portion of the image, the predetermined portion being displayed across a first of the display screens and a second of the display screens across a screen boundary between the display screens; and
   a control section that causes, based on a predetermined, second directional touch operation on the display screens, any one of the two display screens to display all of the predetermined portion that initially was displayed across the screen boundary between the first and second display screens of said plurality of display screens, while maintaining remaining portions of the image at the first display screen and the second display screen and maintaining some of the predetermined portion that was initially displayed across the screen boundary at the other of the two display screens,
   wherein i) a first direction touch operation causes all the predetermined portion to be displayed on the first display screen without causing any remaining portion of the image located outside of the predetermined portion at the second display screen to move toward the first display screen, and ii) a second direction touch operation causes all the predetermined portion to be displayed on the second display screen without causing any remaining portion of the image located outside of the predetermined portion at the first display screen to move toward the second display screen.

2. The portable information terminal as set forth in claim 1, wherein said predetermined portion is a rectangular region, and
   wherein said touch operation is a touch operation for two display screens that are adjacent to each other.

3. The portable information terminal as set forth in claim 2, the touch panel type input section detects the first touch operation as touching a first point on the first display screen and a second point on the second display screen, and
   wherein a width of said predetermined portion in a direction perpendicular to a longitudinal direction of the boundary of said display screens depends on the first and second points touched by said first touch operation.

4. The portable information terminal as set forth in claim 3, wherein the width of the predetermined portion in the direction perpendicular to the longitudinal direction of the boundary of said display screens depends on components of the first and second points touched by said first touch operation in the direction perpendicular to the longitudinal direction of the boundary of said display screens.

5. The portable information terminal as set forth in claim 3, wherein the width of said predetermined portion in the same direction as the longitudinal direction of the boundary of said display screens is a predetermined length.

6. The portable information terminal as set forth in claim 5, wherein said predetermined portion is a stripe region surrounded by the first and second points touched by said first touch operation formed to match the width of the display screens along the longitudinal direction of the boundary of the display screens.

7. The portable information terminal as set forth in claim 2, wherein the touch panel type input section detects the first touch operation as touching a first point on the first display screen and a second point on the second display screen, and
   wherein said predetermined portion is a region identified by the first and second points touched by said first touch operation.

8. The portable information terminal as set forth in claim 7, wherein the region identified by said first and second points is a rectangular region having diagonal vertexes given by the first and second points touched by said first touch operation.

9. The portable information terminal as set forth in claim 1, wherein said predetermined portion is a predetermined region.

10. The portable information terminal as set forth in claim 1,
    wherein when the first touch operation is performed for two display screens that are adjacent to each other, and said control section identifies said predetermined portion spanning the two display screens,
    wherein the touch panel type input section detects the first touch operation as touching a first point on the first display screen and a second point on the second display screen,
    wherein the first display screen is a left display screen and the second display screen is a right display screen, and the first direction touch operation is a left direction movement and the second direction touch operation is a right direction movement, and
    wherein i) when a user, touching the first and second points, slides the two first and second points with the left direction movement, the control section causes the left display screen to display all of the rectangular region, and ii) when the user, touching the first and second points, slides the two first and second points with the right direction movement, the control section causes the right display screen to display all of the rectangular region.

11. The portable information terminal as set forth in claim 10,
    wherein said first touch operation simultaneously touches the two display screens.

12. The portable information terminal as set forth in claim 11,
    wherein said second directional touch operation is a touch operation that simultaneously slides the first and second points touched by said first touch operation in one direction.

13. The portable information terminal as set forth in claim 12,
    wherein, based on said second directional touch operation, said control section slides said predetermined portion in the same direction as the longitudinal direction of the boundary of the display screens and displays the predetermined portion as the two points slid by said second touch operation and that are moved in the same direction as the longitudinal direction of the boundary of the display screens.

14. The portable information terminal as set forth in claim 12,
wherein said control section causes any one of said two display screens to continuously display said predetermined portion after said second directional touch operation is performed while said two touch panels are being touched as a third touch operation, and said control section causes the display screen to stop displaying the predetermined portion after the third touch operation has been completed.

15. The portable information terminal as set forth in claim 14,
wherein said control section causes any one of said two display screens to continuously display said predetermined portion until after a predetermined period time has elapsed after the third touch operation that continuously touches said two touch panels has been completed, and said control section causes the display screen to stop displaying said predetermined portion after said predetermined period of time has elapsed.

16. The portable information terminal as set forth in claim 15,
wherein while said control section causes any of said two display screens to continuously display said predetermined portion, when a fourth touch operation is performed for a region corresponding to an image portion of the predetermined portion on the touch panel of the display screen, said control section converts coordinates of a position at which the fourth touch operation is performed to coordinates of said predetermined portion and notifies an application that manages an object that is designated by the fourth touch operation of the coordinates of the predetermined portion.

17. The portable information terminal as set forth in claim 16,
wherein when said fourth touch operation is performed, said control section causes any one of said two display screens to stop displaying said predetermined portion.

18. The portable information terminal as set forth in claim 10,
wherein when said first touch operation is performed, said control section causes said predetermined portion to be displayed such that the predetermined portion is distinguishable from said remaining portion.

19. The portable information terminal as set forth in claim 18,
wherein when said first touch operation is performed, said control section causes said predetermined portion to be displayed in three dimensions.

20. The portable information terminal as set forth in claim 10,
wherein when said second directional touch operation is performed, said control section causes any one of said two display screens to display said predetermined portion such that the predetermined portion is distinguishable from said remaining portion.

21. The portable information terminal as set forth in claim 20,
wherein when said second directional touch operation is performed, said control section causes any one of said two display screens to display said predetermined portion in three dimensions.

22. A display control method, comprising:
detecting a predetermined touch operation on display screens of a portable information terminal having a plurality of display screens and a touch panel type input section that senses touch on the individual display screens; and
based on the detected predetermined touch operation, displaying a predetermined portion of an image, that initially lies on two display screens of said plurality of display screens across a screen boundary between the display screens, on any one of the two display screens,
wherein said displaying step displays all of said predetermined portion on the one display screen while maintaining remaining portions of the image at the two display screens and maintaining some of the predetermined portion that was initially displayed across the screen boundary at the other of the two display screens, without causing any remaining portion of the image, located outside of the predetermined portion at the other of the two display screens, to move toward the one display screen.

23. The display control method as set forth in claim 22, further comprising:
when a first touch operation is performed for two display screens that are adjacent to each other, identifying said predetermined portion, and
when a predetermined second touch operation is performed, causing the one display screen to display all of said predetermined portion.

24. The display control method as set forth in claim 23,
wherein said first touch operation simultaneously touches two display screens.

25. The display control method as set forth in claim 24,
wherein said second touch operation is a touch operation that slides the two points touched by said first touch operation in one direction, and
wherein said predetermined portion is displayed on a display screen corresponding to the one direction to which the two points are slid by said second touch operation.

* * * * *